UNITED STATES PATENT OFFICE.

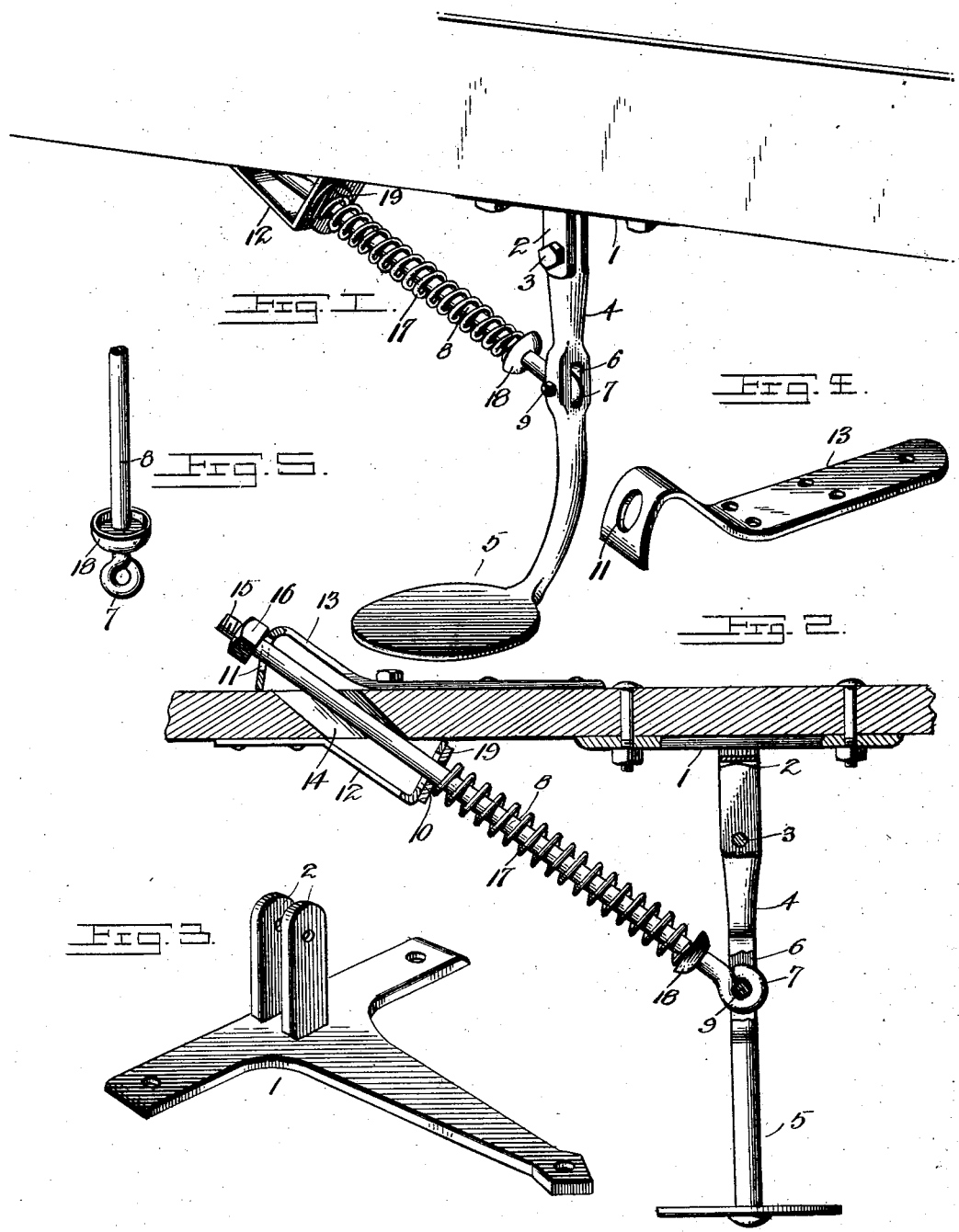

JAMES M. PEYTON AND THEOPHILUS W. LUTTRELL, OF MAXONMILL, KENTUCKY.

VEHICLE-STEP.

SPECIFICATION forming part of Letters Patent No. 694,572, dated March 4, 1902.

Application filed August 7, 1901. Serial No. 71,236. (No model.)

*To all whom it may concern:*

Be it known that we, JAMES M. PEYTON and THEOPHILUS W. LUTTRELL, citizens of the United States, residing at Maxonmill, in the county of McCracken and State of Kentucky, have invented a new and useful Vehicle-Step, of which the following is a specification.

The invention relates to improvements in vehicle-steps.

The object of the present invention is to improve the construction of vehicle-steps and to provide a simple, inexpensive, and efficient one of great strength and durability designed for use on buggies and other vehicles and adapted when it comes in contact with a stump or other obstruction to swing rearward and pass over the same without injury to it or the vehicle.

The invention consists in the construction and novel combination and arrangement of parts hereinafter fully described, illustrated in the accompanying drawings, and pointed out in claims hereto appended.

In the drawings, Figure 1 is a perspective view of a vehicle-step constructed in accordance with this invention and shown applied to a portion of a vehicle. Fig. 2 is a vertical sectional view of the same. Fig. 3 is a detail perspective view of the bracket. Fig. 4 is a similar view of the upper guide-plate. Fig. 5 is a detail view of the lower end of the spring-actuated rod, illustrating the construction of the seat for the lower end of the spring.

Like numerals of reference designate corresponding parts in all the figures of the drawings.

1 designates a bracket designed to be secured to the bottom of the body of a buggy or other vehicle and consisting of a T-shaped plate and a pair of depending arms 2, provided near their lower ends with perforations for the reception of a pivot-bolt 3, which passes through the standard or upright portion 4 of a step 5. The T-shaped plate of the bracket is designed to conform to the configuration of the framework of the bottom of the buggy or other vehicle, and the standard or upright portion of the step is provided between its ends with an opening 6, in which is pivoted the lower end 7 of a spring-actuated connecting rod or brace 8. The connecting rod or brace 8, which holds the step normally in proper position for use, is provided at its lower end 7 with an eye, through which passes a pivot-bolt 9, which is also arranged in perforations of the standard or upright portion of the step.

The inclined rod or brace, which extends upward and rearward at an angle to the upright portion or standard of the step, passes through openings 10 and 11 of lower and upper guide-plates 12 and 13, arranged as illustrated in Fig. 2 of the accompanying drawing and secured to the framework of the body of the buggy or other vehicle, which is provided with an opening 14. The lower guide-plate, which is secured by suitable fastening devices to the body in rear of the opening 14, is provided with an approximately V-shaped front portion, which is provided at the front side with the said opening 10. The upper plate, which is secured in advance of the opening 14, is provided at its rear end with an approximately V-shaped portion, which has the said opening 11 at its rear side. The opening 14 is inclined, and the openings 10 and 11 are arranged in alinement with the same and receive the inclined rod or brace, whereby the latter is guided in its reciprocation.

The upper end 15 of the inclined rod or brace is threaded for the reception of a nut 16, which engages the upper guide-plate to form a stop for limiting the forward or downward movement of the inclined brace or rod. The lower portion of the inclined rod or brace receives a coiled spring 17, which is interposed between the lower guide-plate and a lower stop 18, consisting of an annular flange or collar fixed to the rod or brace and provided at its upper face with an annular groove forming a seat for the lower end of the coiled spring. The coiled spring is adapted to throw the step forward, and it holds the same at the limit of its forward movement, and thereby maintains the said step in proper position for use. The openings 10 and 11 are of sufficient size to permit a limited lateral play of the rod, and a washer 19 is preferably interposed between the upper end of the spring and the lower guide-plate, as clearly shown in Fig. 1.

Should the step come in contact with the stump of a tree or other obstruction, it will swing rearward against the action of the coiled spring and it will pass over such obstruction without jarring or otherwise injuring the vehicle, and the spring will return the step to its normal position as soon as the same has passed beyond such obstruction.

It will be seen that the step is exceedingly simple and inexpensive in construction, that it possesses great strength and durability, and that it is adapted to be readily applied to a vehicle. It will also be seen that efficient means are provided for holding the step normally in proper position for use and that the step is adapted to swing rearward should it come in contact with the stump of a tree or other obstruction, whereby injury to it or to the vehicle is prevented.

What we claim is—

1. A device of the class described comprising a hinged step adapted to swing rearward, an inclined rod or brace extending upward from the step and designed to be connected with the body of the vehicle, a spring disposed on the rod or base and holding the step normally in proper position for use, and means for limiting the movement of the rod or brace, substantially as described.

2. A device of the class described comprising a hinged step adapted to swing rearward, an inclined rod or brace extending upward from the step and connected with the same at its lower end, the upper end of the rod or brace being slidingly connected with the vehicle, means for limiting the reciprocation of the rod or brace, and a spring for holding the step normally in position for use, substantially as described.

3. A device of the class described comprising a hinged step, an inclined rod or brace pivoted at its lower end to the step, a guide-plate designed to be mounted on the body of the vehicle and having a guide-opening, receiving the rod, a coiled spring disposed on the rod and engaging the same, and means for limiting the movement of the rod, substantially as described.

4. A device of the class described comprising a hinged step, the upper and lower guide-plates designed to be mounted on the body of a vehicle and provided with approximately V-shaped portions having oppositely-disposed guide-openings, an inclined rod or brace passing through the guide-openings and connected at its lower end to the step and provided at its upper end with means for engaging the upper guide-plate, said rod or brace being also provided near its lower end with a stop, and a coiled spring disposed on the rod or brace and interposed between the stop and the lower guide-plate, substantially as described.

In testimony that we claim the foregoing as our own we have hereto affixed our signatures in the presence of two witnesses.

JAMES M. PEYTON.
THEOPHILUS W. LUTTRELL.

Witnesses:
W. V. EATON,
MCD. FERGUSON.